Dec. 19, 1967 R. W. SNUDDEN 3,358,972
MIXING DEVICES
Filed Sept. 8, 1965 4 Sheets-Sheet 1

INVENTOR
ROBERT WILLIAM SNUDDEN

By Cushman, Darby & Cushman
ATTORNEYS

Dec. 19, 1967    R. W. SNUDDEN    3,358,972
MIXING DEVICES

Filed Sept. 8, 1965    4 Sheets-Sheet 2

INVENTOR
ROBERT WILLIAM SNUDDEN

BY Cushman, Darby & Cushman
ATTORNEYS

Dec. 19, 1967 R. W. SNUDDEN 3,358,972
MIXING DEVICES
Filed Sept. 8, 1965 4 Sheets-Sheet 3

INVENTOR
ROBERT WILLIAM SNUDDEN

BY Cushman, Darby & Cushman
ATTORNEYS

Dec. 19, 1967   R. W. SNUDDEN   3,358,972
MIXING DEVICES

Filed Sept. 8, 1965   4 Sheets-Sheet 4

INVENTOR
ROBERT WILLIAM SNUDDEN
BY
Cushman, Darby & Cushman
ATTORNEYS

United States Patent Office 3,358,972
Patented Dec. 19, 1967

3,358,972
MIXING DEVICES
Robert William Snudden, Dumfries, Scotland, assignor to Imperial Chemical Industries Limited, London, England, a corporation of Great Britain
Filed Sept. 8, 1965, Ser. No. 485,793
Claims priority, application Great Britain, Sept. 8, 1964, 36,728/64
10 Claims. (Cl. 259—138)

ABSTRACT OF THE DISCLOSURE

A blade for mounting on a shaft of a stirring device is constructed to include a shape for the blade which, when projected onto a plane that is perpendicular to the axis of the shaft and which passes through the junction of the blade and the shaft, is substantially a parallelogram. The blade is curved by a displacement of two opposite corner of the blade away from the plane of projection, and the curvature may be in the form of a cylinder portion.

Brief summary of invention

This invention relates to mixing devices and in particular to devices suitable for stirring fluids.

According to the present invention we provide a stirring device comprising a blade mounted on a shaft, said blade having a shape which, when projected on to the plane that is perpendicular to the axis of the shaft and passes through the junction of the blade and the shaft, is substantially a parallelogram, the axis of said shaft passing through the point of intersection of the diagonals of said parallelogram, the blade being shaped so that at least two opposite corners of the blade are displaced from said plane.

While it is preferred that the shape of the blade projected on to the plane of the parallelogram is in fact a parallelogram, the shape of the blade may be modified so that the shape projected on to the plane of the parallelogram is modified from that of a true parallelogram in so far as the edges of the shape may be slightly curved and/or the corners rounded.

The shape of the blade projected on the plane of the parallelogram will hereinafter be referred to as the parallelogram.

Detailed description of invention

Figure 1:
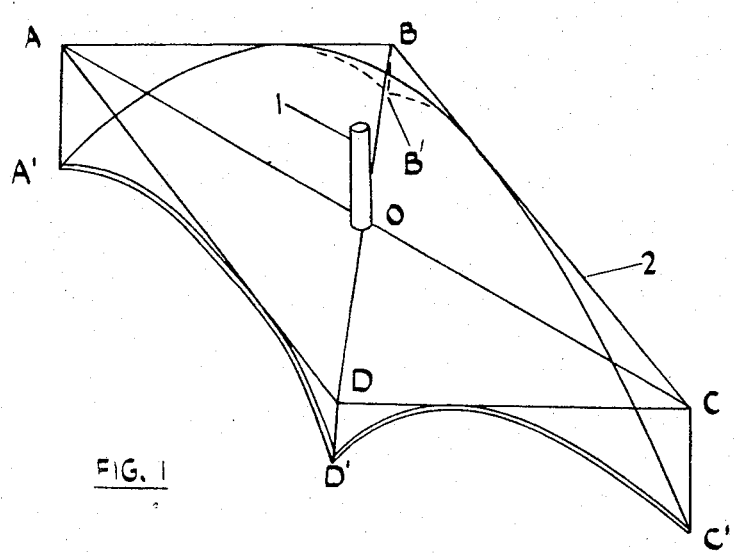
FIGURE 1 is a perspective view of a general form of stirrer according to the present invention.

The invention is illustrated but in no way limited by reference to the accompanying drawings. In FIGURE 1, which is a perspective view of a general form of stirrer according to the invention, the stirrer comprises a blade A'B'C'D' mounted on a shaft 1. The plane of the parallelogram is plane 2 and is perpendicular to shaft 1.

In this embodiment the corners A', B', C' and D' are displaced from the plane 2 of the parallelogram by distances AA', BB', CC' and DD' respectively. If the shape of blade A'B'C'D' is projected on to the plane 2, a parallelogram ACBD is described.

Figure 2:
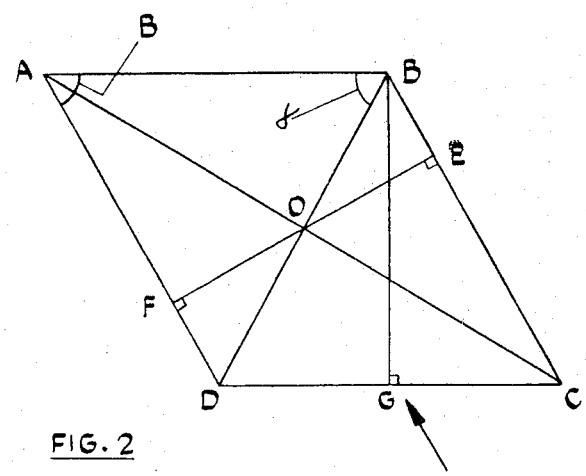
FIGURE 2 illustrates a parallelogram formed from a projection of the blade shape shown in FIGURE 1.

The general form of the parallelogram is shown in FIGURE 2. The shaft 1 is fixed to the blade at point 0 which is the point of intersection of the diagonals AC and BD of parallelogram ABCD. The angle BAD of the parallelogram is termed angle $\beta$ and angle ABD is termed angle $\gamma$. While angle $\beta$ may be 90°, thereby making the parallelogram a rectangle, we prefer that it is between 20° and 70°, in particular between 30° and 60°.

For a non-rectangular parallelogram we prefer that angle $\gamma$ is between 80° and 100°, preferably a right angle.

Figure 3:
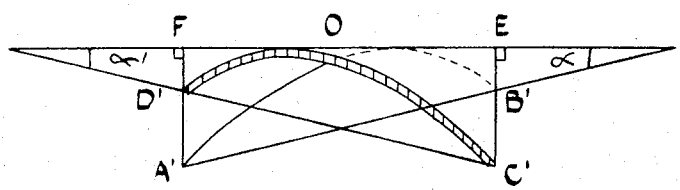
FIGURE 3 illustrates a projection of the blade shown in FIGURE 1 when viewed in the direction of the arrow of FIGURE 2.

If the blade is projected on to the plane that is perpendicular to the plane of the parallelogram and that passes through the line FOE in FIGURE 2 (that is the perpendicular from line AD, through the intersection of diagonals AC and BC, to line BC), the projected figure appears as in FIGURE 3 when viewed looking in the direction of the arrow.

Preferably the opposite corners A' and C' are displaced equally from the plane of the parallelogram. Preferably corners B' and D' of the blade are not displaced from the plane of the parallelogram. However, if they are displaced, then we prefer that they are displaced equally. In such a case where corners A' and C' are also displaced equally from the plane of the parallelogram but to a different extent from corners B', D', the angles of incidence of the blade to the horizontal, i.e. angles $\alpha$ and $\alpha'$, will be equal. We prefer that angles $\alpha$ and $\alpha'$ lie between 5 and 30°, in particular between 20 and 25°.

Figure 4:
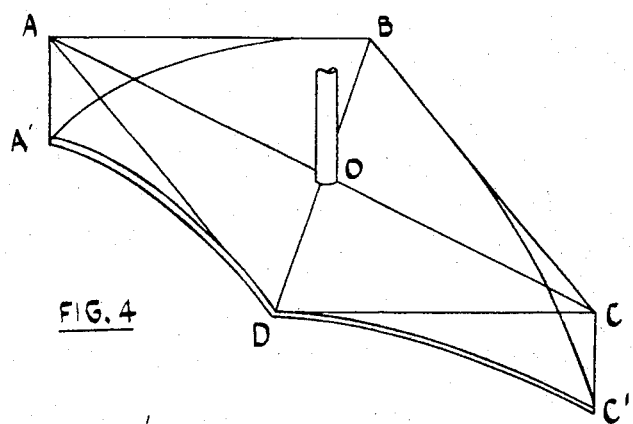
FIGURE 4 is a perspective view of a stirring blade wherein two opposed corners are not displaced.
Figure 5:
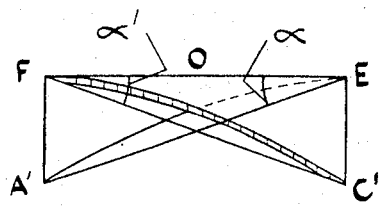
FIGURE 5 is an end view of the preferred embodiment in FIGURE 4 when viewed as in FIGURE 3.

This preferred embodiment where corners B' and D' are not displaced is shown in FIGURES 4 and 5 which are views similar to those of FIGURES 1 and 3.

While in the FIGURES 4 and 5 it is the corners corresponding to the corner of the parallelogram that contain the acute angles, that are displaced from the plane of the parallelogram, this is not essential. In some cases, the corners of the blade corresponding to the corners of the parallelogram containing the acute angles may be in the plane of the parallelogram while the corners of the blade corresponding to the corners of the parallelogram that contain the obtuse angles may be the only ones that are displaced from the plane of the parallelogram. Alternatively both pairs of corners may be displaced, the corners corresponding to the corners of the parallelogram containing the acute angles being displaced to a greater extent from the plane of the parallelogram than the other corners of the blade.

One pair of corners of the blade may be displaced in one direction from the plane of the parallelogram while the other pair is displaced in the opposite direction.

Figure 6:
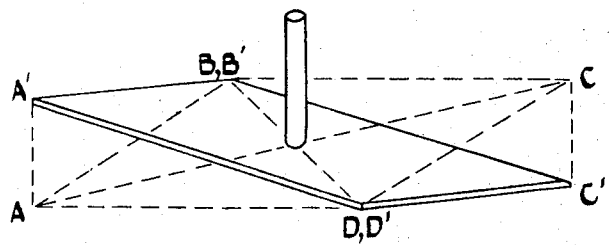
FIGURE 6 is a perspective view of an alternative form of stirring blade.
Figure 7:
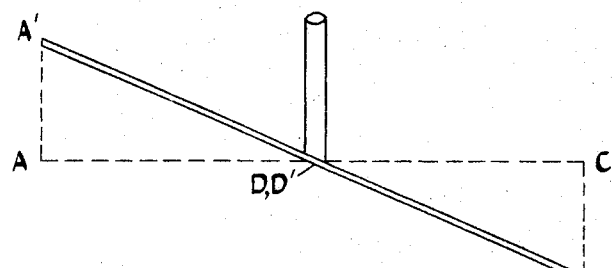
FIGURE 7 is a side elevation of the blade shown in FIGURE 6.

Alternatively opposite corners of the blades are displaced in different directions from the plane of the parallelogram. In a simple case the stirrer may be in the form of a flat parallelogram mounted at an angle to the stirrer shaft. This arrangement is shown in FIGURE 6 which is a perspective view of the stirrer and in FIGURE 7 which is a side elevation of the stirrer. The stirrer blade is A'B'C'D' and the "plane of the parallelogram" is plane ABCD.

The size of the stirrer depends largely on the size of the vessel in which it is to be used and on the degree of agitation and on the viscosity of the medium.

The length of the longer diagonal of the parallelogram should in general be between 10 and 90%, in particular between 20 and 90% of the shortest dimension of the vessel in the plane of the parallelogram.

Where the parallelogram is a rectangle, each diagonal is of equal length, and in this case each diagonal should be between 10 and 95%, preferably 20 to 90%, of the shortest dimension of the vessel in the plane of the parallelogram. Where the vessel has a circular cross-section in the plane of the parallelogram the shortest dimension is in fact the diameter of the circular cross-section.

The stirrer is preferably mounted in the vessel so that the axis of the shaft is parallel to and preferably concentric with the axis of the vessel. However, in some cases, a greater degree of agitation is obtained when the stirrer is offset from the axis of the vessel.

The shape of the parallelogram is also determined by the ratio of the distance between the pair of sides AB and CD (referring to FIGURE 2) (i.e. the length of line BG which is the perpendicular from B to line CD) to the length of diagonal AC. This ratio is preferably in the range 0.65 to 0.8, in particular 0.675 to 0.75.

Figure 8:
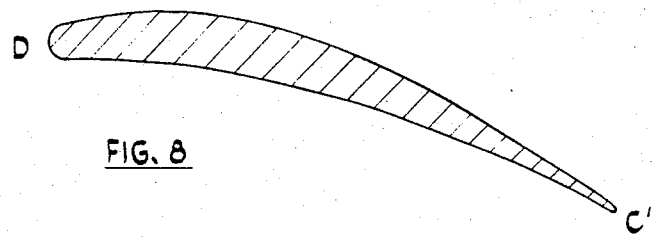
FIGURE 8 is a cross sectional view of a blade which may be provided for the stirrer of this invention.

Stirrers of the types shown in FIGURES 1 and 4 would normally be rotated in a clockwise direction. In this case corners A' and C' of the blade can be considered as "trailing," while corners B' and D' are "leading." Thus that part of the edge B'C' near to B' is a "leading" edge while that part near C' is a "trailing" edge. We prefer that the cross-section of the blade, for example as viewed in the direction of the arrow in FIGURE 2 has an aerofoil section, i.e. the "leading" edge is rounded while the "trailing" edge is "feathered" or "tapered." Such a section is shown in FIGURE 8.

Good results may also be obtained using a blade not having an aerofoil section. Such blades preferably have a smooth curved surface which is preferably the surface of a cylinder having an elliptical or, preferably, circular cross-section. In the latter case the blade may be made by cutting it from a thin walled tube.

The maximum thickness of the blade is preferably at least 0.003 and in particular at least 0.005 times the length of the longer diagonal of the parallelogram.

The blade may be constructed from any suitable material. Such materials will depend to some extent on the nature of the medium being stirred. Metals such as stainless steel are particularly useful and in some cases it may be desirable to coat the blade with a protective layer, for example an electroplated deposit of a metal such as nickel or chromium or a layer of polytetrafluoroethylene, to minimise corrosion. For some applications stirrers made from plastics may be used. Examples of suitable plastics include nylon, thermoset plastics and oxymethylene polymers.

Figure 10:
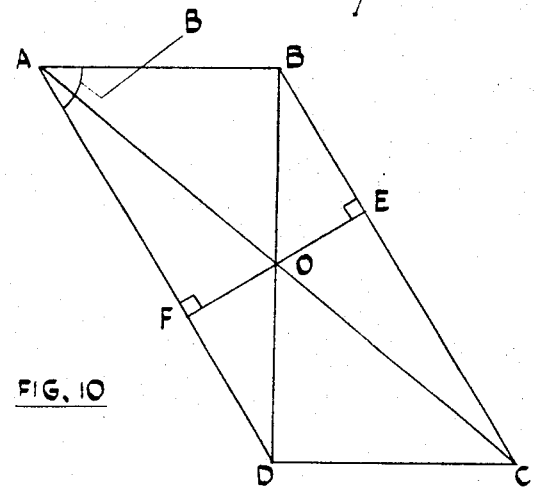
FIGURE 10 is a view of a parallelogram projected from the blade of FIGURE 9.
Figure 11:
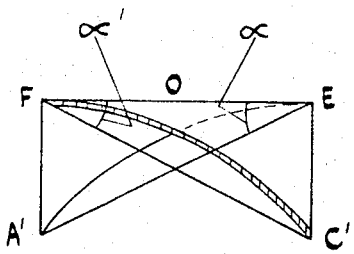
FIGURE 11 is an end view projection of the blade shown in FIGURE 9.

In a preferred embodiment the angle γ is 90° and the blade has a surface corresponding to the surface of a cylinder of circular cross-section, the diagonal BD preferably is parallel to the axis of the cylinder. In such a case, illustrated in FIGURES 9, 10 and 11 which are views similar to those of FIGURES 1, 2 and 3, FIGURE 9 also showing the cylinder from which the blade is derived, the ratio of the length BD to the radius of the cross-section of the cylinder is preferably in the range of 1.1 to 1.6, preferably 1.2 to 1.5.

Figure 9:
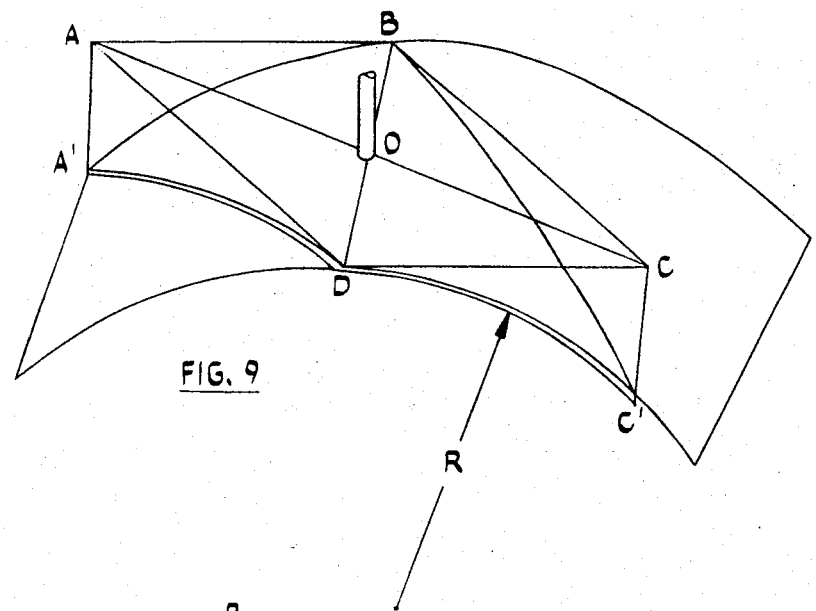
FIGURE 9 is a perspective view of a stirrer blade having a surface corresponding to the surface of a cylinder.
Figure 12:
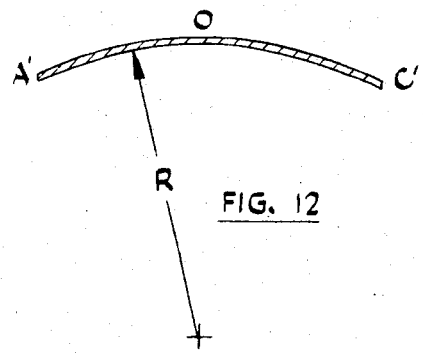
FIGURE 12 shows a radius of curvature for a particular projection of the blade of FIGURE 9.

In FIGURE 12, the blade of FIGURE 9 is shown projected on to the plane that is perpendicular to the plane of the parallelogram and perpendicular to diagonal BD. The radius of the cylinder is indicated by R.

In Table 1, typical dimensions in inches of preferred stirrers are shown, the stirrers being of the type shown in FIGURES 9 to 12.

TABLE 1

| No. | Length BD | Length AC | R | α° | BD/AC | BD/R |
|---|---|---|---|---|---|---|
| 1 | 8.25 | 11.5 | 6.25 | 22.5 | 0.717 | 1.32 |
| 2 | 5.625 | 8 | 4.5 | 22.5 | 0.704 | 1.25 |
| 3 | 3.10 | 4.4 | 2.35 | 22.5 | 0.705 | 1.32 |
| 4 | 11.8125 | 16 | 0.75 | 20 | 0.738 | 1.212 |
| 5 | 3.5 | 5.0625 | 2.875 | 22.5 | 0.692 | 1.219 |
| 6 | 40.25 | 55 | 29.5 | 22.5 | 0.732 | 1.365 |
| 7 | 3 | 4.125 | 2 | 22.5 | 0.728 | 1.5 |
| 8 | 2.4375 | 3.5 | 1.875 | 22.5 | 0.696 | 1.3 |
| 9 | 3 | 4.3125 | 2.375 | 22.5 | 0.728 | 1.321 |

The stirrers may be used for any process where it is desired to agitate a fluid. It may be used in processes where gases have to be mixed with other gases or with liquids. In particular it is useful for processes in which it is desired to stir a solid or liquid suspended or dispersed in another liquid. Such processes are encountered in the manufacture of polymeric materials from ethylenically unsaturated monomers. Such polymerisation processes, which are often termed emulsion or suspension polymerisation processes comprise agitating a monomer dispersed in a medium, often water, in the presence of a surface active agent or a dispersing agent and a free radical liberating catalyst.

Suitable monomers include vinyl chloride, vinylidene chloride, vinyl acetate, methyl methacrylate, styrene, tetrafluoroethylene and mixtures of monomers such as butadiene and acrylonitrile.

It has been found that by using stirrers according to the present invention, the power consumed in the agitation process is often greatly reduced compared with normal stirrers such as paddles.

Because of the power saving the stirrers are also useful in processes where media have to be stirred for very long periods, for example in the preparation of pharmaceuticals from cultures.

The invention is further illustrated but in no way limited by the following example in which all parts are by weight.

*Example*

This example demonstrates the use of the stirrer in the polymerisation of vinyl chloride in aqueous suspension.

The polymerisation vessel was a vertical cylindrical autoclave of 72 inches inside diameter and capacity about 13.6 cubic metres.

The stirred used was No. 6 in Table 1. This had an average thickness of about 0.5 inch and was made from a sheet of stainless steel. The stirrer axis was concentric with the axis of the autoclave.

The autoclave was charged with 16,200 parts of water to which 14.2 parts of a partially hydrolysed polyvinyl acetate (73–76% hydrolysed) was added as a dispersing agent. 4.75 parts of a peroxidicarbonate were added as a catalyst and 9500 parts of vinyl chloride were then charged to the autoclave. The liquid mixture occupied about 92% of the volume of the autoclave. The stirrer was rotated at 120 r.p.m. and the autoclave maintained at 51° C. The average power consumed was about 15 horsepower. When the polymerisation was complete the slurry was spray dried to give a white powdery polymer.

The experiment was repeated using different stirrer speeds.

Figure 13:
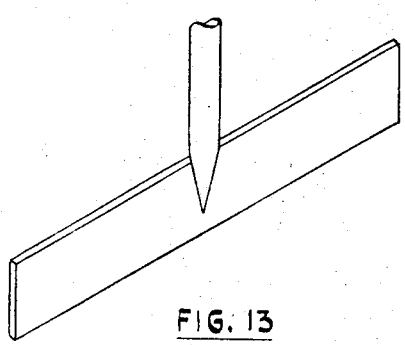
FIGURE 13 illustrates a paddle stirrer used in tests which compare the paddle stirrer to the improvements of the present invention.

As a comparison polymerisation was conducted using a two bladed paddle stirrer of the type shown in FIGURE 13. This stirrer had a diameter of 53 inches and a blade width of 9½ inches.

The particle size distribution of the polymers obtained was measured by retention on standard meshes.

The results are shown in Table 2.

TABLE 2

| Stirrer type | Stirrer Speed, r.p.m. | Average H.P. consumed | Particle size, percent retained on B.S. Mesh No. | | | | |
|---|---|---|---|---|---|---|---|
| | | | 52 | 72 | 100 | 150 | 200 |
| Parallelogram stirrer | 120 | 15 | 0.4 | 0.7 | 9.8 | 41.2 | 31.7 |
| | 140 | 19 | 0 | 0.6 | 31.6 | 49.7 | 13.6 |
| | 150 | 22 | 0 | 0.4 | 27.4 | 63.3 | 7.1 |
| | 160 | 26 | 0 | 0.4 | 44.5 | 47.9 | 5.7 |
| Paddle stirrer | 120 | 33 | 0 | 0.1 | 33.5 | 42.5 | 20.5 |

The B.S. Meshes have aperture sizes as follows:

| Mesh | Aperture, μ |
|---|---|
| 52 | 295 |
| 72 | 210 |
| 100 | 150 |
| 150 | 105 |
| 200 | 76 |

Thus it is seen that to get a polymer of equivalent particle size, far less power is consumed by a parallelogram stirrer than by a paddle stirrer.

I claim:

1. An improved stirring device comprising a lamina blade mounted on a shaft, said blade having a shape which, when projected onto a plane that is perpendicular to the axis of the shaft and which passes through the junction of the blade and the shaft, is substantially a parallelogram, the axis of said shaft passing through the point of intersection of the diagonals of said parallelogram, the blade being shaped so that at least two of its opposite corners are displaced from said plane, wherein the improvement resides in said blade having a curved surface conforming to the surface of a cylinder of elliptical cross-section, said blade being shaped so that only one pair of opposite corners of the blade is displaced from the plane which is perpendicular to the axis of the shaft and which passes through the junction of the blade and the shaft.

2. A stirring device as claimed in claim 1, wherein the blade is shaped such that the two displaced corners of the blade are displaced equally from the plane which perpendicular to the axis of the shaft and which passes through the junction of the blade and the shaft.

3. A stirring device as claimed in claim 1, wherein the blade has a shape which, when projected onto the plane which is perpendicular to the axis of the shaft and which passes through the junction of the blade and the shaft, is a non-rectangular parallelogram, the said opposite corners displaced from said plane corresponding to the corners of said parallelogram including acute angles.

4. A stirring device as claimed in claim 1 wherein the blade has a shape which, when projected onto the plane that is perpendicular to the axis of the shaft and passes through the junction of the blade and the shaft, is a parallelogram in which the included angle between one pair of adjacent sides is between 20° and 70°.

5. A stirring device as claimed in claim 1, wherein the blade has a maximum thickness of at least 0.003 times the length of the longer diagonal of the parallelogram.

6. A stirring device as claimed in claim 1, wherein said parallelogram has a form in which the ratio of the perpendicular distance between the shorter pair of sides and the length of the longer diagonal is in the range 0.65 to 0.8.

7. A stirring device as claimed in claim 1 wherein said blade has a curved surface conforming to the surface of a cylinder of circular cross section.

8. A stirring device as claimed in claim 1, wherein the blade has a maximum thickness of at least 0.003 times the length of either diagonal of said parallelogram when said parallelogram is a rectangle.

9. An improved stirring device comprising a lamina blade mounted on a shaft, said blade having a shape which, when projected onto a plane that is perpendicular to the axis of the shaft and which passes through the junction of the blade and the shaft, is substantially a parallelogram, the axis of said shaft passing through the point of intersection of the diagonals of said parallelogram, the blade being shaped so that at least two of its opposite corners are displaced from said plane, wherein the improvement resides in said blade having a curved conforming to the surface of a cylinder of circular cross-section, said blade further having a shape which, when projected onto the plane which is perpendicular to the axis of the shaft and which passes through the junction of the blade and the shaft, is a non-rectangular parallelogram in which the shorter diagonal is perpendicular to an adjacent side of the parallelogram, wherein said surface of the blade conforms to that of a cylinder of circular cross-section and said diagonal is parallel to the axis of said circular cylinder.

10. A stirring device as claimed in claim 9, wherein the blade has a shape which, when projected onto the plane which is perpendicular to the axis of the shaft and passes through the junction of the blade and the shaft, is a non-rectangular parallelogram in which the ratio of the length of the shorter diagonal to the radius of the cross-section of said circular cylinder being in the range of 1.1 to 1.6.

References Cited

UNITED STATES PATENTS 845,341  2/1907  Dunlap ............ 259—135
3,158,360  11/1964  Dunn ............ 259—135

WILLIAM I. PRICE, *Primary Examiner.*